US012763845B2

(12) United States Patent
Montgomery et al.

(10) Patent No.: US 12,763,845 B2
(45) Date of Patent: Oct. 13, 2026

(54) SPACE CLOUD MESH ARCHITECTURE

(71) Applicant: RTX BBN Technologies, Inc., Cambridge, MA (US)

(72) Inventors: Benjamin Montgomery, Boston, MA (US); Peter H. Fischer, Columbia, MD (US); Syed Ali Naqvi, Bel Air, MD (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 208 days.

(21) Appl. No.: 18/416,056

(22) Filed: Jan. 18, 2024

(65) Prior Publication Data

US 2025/0023627 A1 Jan. 16, 2025

Related U.S. Application Data

(60) Provisional application No. 63/439,621, filed on Jan. 18, 2023.

(51) Int. Cl.
*H04B 7/185* (2006.01)
*H04B 1/00* (2006.01)

(52) U.S. Cl.
CPC ......... *H04B 7/1851* (2013.01); *H04B 1/0003* (2013.01); *H04B 7/18521* (2013.01)

(58) Field of Classification Search
CPC .............. H04B 1/0003; H04B 7/18521; H04B 7/1851; H04B 1/00; H04B 7/185
See application file for complete search history.

(56) References Cited

U.S. PATENT DOCUMENTS

2019/0394737 A1* 12/2019 Luo ....................... H04W 40/12

FOREIGN PATENT DOCUMENTS

CN 109981438 A 7/2019

OTHER PUBLICATIONS

Boero Luca, et al. "Satellite Networking Integration in the 5G Ecosystem: Research Trends and Open Challenges", IEEE Network, vol. 32, No. 5, Sep. 1, 2018, pp. 9-15.
Michel S. Bonfim et al. "Integrated NFV/SDN Architectures: A Systematic Literature Review", Arxiv. Org, Cornell University Library, 14853, Jan. 4, 2018, Section 2.
Notification of Transmittal of the International Preliminary Report on Patentabiltiy; PCT/US2024/011998; Jul. 31, 2025, 9 pages.
Notification of Transmittal of the International Search Report and the Written Opinion of the International Searching Authority, or the Declaration; PCT/US2024/011998; Jun. 7, 2024, 15 pages.

(Continued)

*Primary Examiner* — Tuan H Nguyen
(74) *Attorney, Agent, or Firm* — CANTOR COLBURN LLP

(57) ABSTRACT

Systems, devices, methods, and computer-readable media provide resilient space cloud architectures. A device includes a distributed, disrupted, disconnected and denied D4 enabled satellite configured for D4 operations in a mesh network of D4 enabled satellites, the D4 enabled satellite comprising virtual network functions (VNFs), a network virtual function orchestrator (NFVO), and a software defined network (SDN) controller configured for secure VNF-VNF or VNF-ground communications.

19 Claims, 6 Drawing Sheets

(56) References Cited

OTHER PUBLICATIONS

R. Ferrus et al. "SDN/NFV-enabled satellite communications networks: Opportunities, scenarios and challenges", Physical communication, Mar. 1, 2016, pp. 1-28.
Radar image: [retrieved on Sep. 9, 2025 (Sep. 9, 2025)]. Retrieved from the internet:, https://www.raytheonmissilesanddefense.com/capabilities/products/ltamds#gallery-4.
Ray Partha Pratim et al., "SDN/NFV architectures for edge-cloud oriented IoT: A systematic review", Computer Communications, Elsevier Science Publishers BV, vol. 169, Jan. 28, 2021, pp. 129-153.

* cited by examiner

SPACE CLOUD MESH ARCHITECTURE

RELATED APPLICATION

This application claims the benefit of priority to U.S. Provisional Patent Application 63/439,621 titled "Distributed, Disconnected, Disrupted, Denied Space Cloud Mesh Architecture" and filed on Jan. 18, 2023, which is incorporated herein by reference in its entirety.

TECHNICAL FIELD

Embodiments regard disruption-tolerant mesh architectures. Some embodiments regard anti-access area-denied networking. Some embodiments regard distributed, disrupted, disconnected, and denied (D4) environments, such as can include satellite or other aerial environments.

BACKGROUND

A space transport layer will be a focal point of contention if not denial. Any architecture built for space transport layer must be resilient to such denial. Several software-defined network (SDN) and/or network function virtualization (NFV) based solutions have been proposed for integrated satellite terrestrial network provisioning. The prior work focused on providing a solution either to i) usage of SDN controllers to enhance the network management capabilities of satellite constellation operators ii) or optimal path selection over SDN/NFV-based satellite network iii) or securing the satellite network from unauthorized access. A dynamic controller leader placement algorithm is proposed for a low-Earth orbit (LEO) constellation that determines optimal controller-satellite placement that minimizes the average flow setup time based on the current traffic demands and users' geographical position and time zone. SDN-based centralized routing solutions have been proposed that exploit the predictability of satellite networks that determine the optimal routing path for the predicted satellite network topology in each time period. In terms of security, a lightweight handover authentication scheme has been proposed that is tailored for an SDN-based satellite communication network. A low-latency proxy signature-based authentication scheme has been proposed for a non-SDN based satellite communication network. However, none of these works provide a multilevel security scheme tailored for satellite communication.

DETAILED DESCRIPTION

Figure 1:
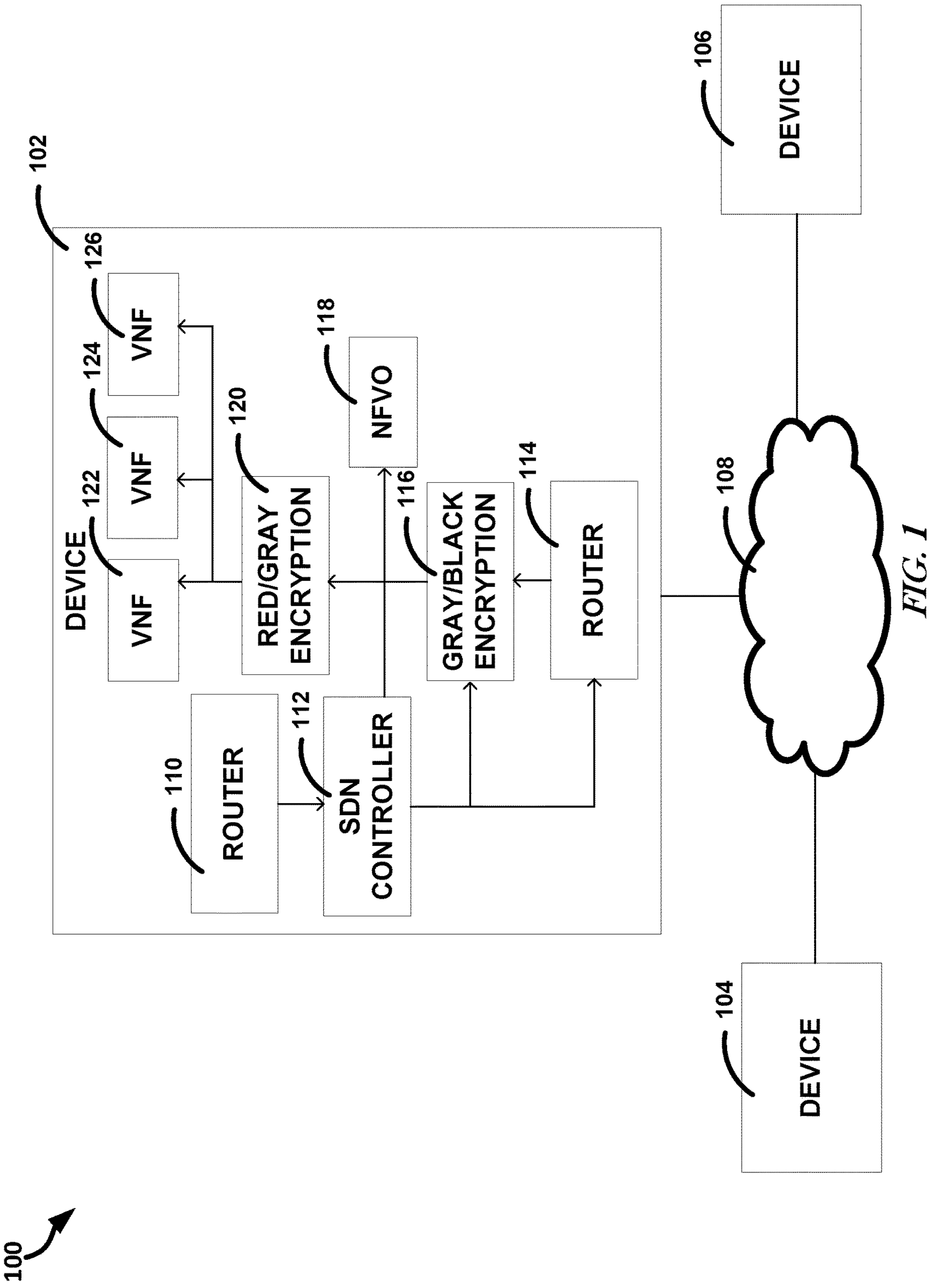
FIG. 1 illustrates, by way of example, a diagram of an embodiment of a space cloud mesh architecture system.

The following description and the drawings sufficiently illustrate teachings to enable those skilled in the art to practice them. Other embodiments may incorporate structural, logical, electrical, process, and other changes. Portions and features of some examples may be included in, or substituted for, those of other examples. Teachings set forth in the claims encompass all available equivalents of those claims.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Satellite communications will play a key role in future wireless communication systems. The integration of satellite networks with current terrestrial cellular networks will provide long range communications across remote locations and ubiquitous connectivity with infrastructureless and unattended networks, such as networks in rural areas, public safety networks, tactical networks and critical infrastructure. The non-terrestrial-to-terrestrial network integration will further support serving hotspot areas in which user demands far exceed the serving capacity of the locally deployed terrestrial base stations. The promising benefits of satellite to terrestrial network integration is specifically supported by the widespread of Low Earth Orbit (LEO) megaconstellation satellite systems. LEO satellites are typically deployed at altitudes proximal to earth (in the range of 500 km-1,500 km). The relatively low cost of LEO satellite enables the deployment of mega constellations thus achieving wide range and low latency communications.

However, traditional satellite communications systems are inflexible in terms of configuration and traffic scheduling. Services are typically deployed in vendor-specific ground terminals. In addition, LEO satellites orbit at high speed around 7.8 kilometers per second (km/s). Thus, the integrated network will be subject to frequent topology changes and handovers. Hence, services will constantly suffer from disruption if not managed in real-time. A scalable, unifying and dynamic management scheme is therefore crucial to provision the communication among the LEO satellite mega-constellation and across the multivendor LEO satellite mega-constellation.

Software-defined networking (SDN) and network function virtualization (NFV) are two state-of-the-art networking solutions that are promising to help realize the unified adaptive management and provisioning for the integrated satellite terrestrial network system. SDN relies on the softwarization as well as the separation of the data plane and control plane. Thus, SDN allows for flexible and robust deployment of control functions and allowing for a simplified data plane to be deployed closer to an edge (end user device) of the network, therefore achieving low-latency communication and scalable deployments. In integrated satellite and terrestrial networks (ISTN), SDN will consequently allow distributed and dynamic deployment of inter-gateway routing protocol (IGRP) and provisioning of network control functions across the LEO satellite mega-constellation as well as in the associated terrestrial networks.

NFV allows network functions and services to be implemented in software instead on a dedicated physical device. Thus, it allows flexible adaptability and movement of network services as well as case of deployment of services in dedicated datacenters or a cloud infrastructure, providing unified computing, storage, and connectivity services. The flexible management as well as the case of deployment of network services provided by NFV allows for interoperability in the integrated satellite to terrestrial networks as well adaptability to support future use cases and dynamic QoS demands.

The frequent communication resulting from dynamic and distributed management needed for the ISTNs makes them prone to eavesdropping and security attacks. For instance, adversaries can exploit the distributed nature of the LEO satellite network to launch distributed denial of service attacks (DDoS) through malicious or compromised ground users, which necessitates the need for a robust distributed security schemes across the network and data. Therefore, a multilevel security scheme such as the one prescribed by Commercial Solution for Classified Products (CSfC) mechanism is needed for hybrid (Commercial and Defense partnered) LEO constellation deployment.

To that end, a Distributed, Disrupted, Disconnected and Denied (D4) space network cloud is provided—a secure pLEO satellite networking framework comprised of fault-tolerant SDN, resilient NFV infrastructure, CSfC multi-site connectivity support, and a low size, weight, and power (SWAP) implementation to fit the space-qualified hardware instantiation requirements. D4 allows instantiating various pLEO network applications with the same Quality of Experience (QoE) offering as that of the geo-synchronous applications but with better Quality of Service (QoS), such as latency and resiliency in the face of disruption.

Embodiments include a scalable SDN/NFV-based satellite communications framework called D4 that jointly provides resilience against network disruptions as well as multilevel security. Embodiments provide one or more of the following advantages:

1) A hierarchical SDN architecture that scales even in the face of disruptions and provides familiar vendor-neutral network management, with optional autonomous on-orbit reconfiguration in response to outages, losses, or changing mission requirements
2) A customized low-SW&P network controller that implements industry standard OpenFlow v1.3 and is compliant with SDA's T1TL NEBULA standard.
3) An event-based distributed routing solution that allows for very efficient path maintenance by using pre-planned time-based routes based on predictive orbital dynamics and expects chaos and allows for quick local path recovery in the case of localized disruptions
4) A container-based function network function virtualization orchestrator (NFVO) that decides which asset(s) should host each service, and how they should hand off responsibilities.

Virtual services can be geostationary, even when serviced by LEO satellites. Services (e.g., Network Custody of Targets) are spun up on an asset as it enters the region of interest, and spun down when it leaves, with transparent handoff between assets, managed by the NFVO over the software-defined network layer. This NFV infrastructure instantiation is resilient to disruption, much-needed when operating in a congested/contested operating environment.

5) D4 uses NSA approved Commercial Solutions for Classified (CSfC) framework for MLS computing that allows utilizing (double) commercial encryption for on orbit relaying of classified data products 1.

Current satellite-provided applications operate using a ground-based route computer that tells the semi-independent SDN controllers on each satellite what to do. Embodiments include a satellite-provided application is achieved through leader-driven information dissemination structure.

FIG. 1 illustrates, by way of example, a diagram of an embodiment of a space cloud mesh architecture system 100. The system 100 includes devices 102, 104, 106 communicatively coupled to each other through a network 108. Each of the devices 102, 104, 106 includes a router 110 communicatively coupled to an SDN controller 112. The SDN controller 112 is communicatively coupled to an NFVO 118, a second router 114, and a black to gray encryption unit 116. The NFVO 118 is communicatively coupled to a red to gray encryption unit 120. The encryption unit 120 provides data to VNFs 122, 124, 126.

The routers 110, 114 are devices that connect two or more packet-switched networks or subnetworks. The routers 110, 114 managing traffic between the networks by forwarding data packets to their intended internet protocol (IP) address, and allowing multiple devices to use the same Internet connection. There are several types of routers, but most routers pass data between local area networks (LANs) and wide area network (WANs). A LAN is a group of connected devices restricted to a specific geographic area. A LAN usually requires a single router. A WAN, by contrast, is a large network spread out over a vast geographic area. Large organizations and companies that operate in multiple locations across the country, for instance, will need separate LANs for each location, which then connect to the other LANs to form a WAN. Because a WAN is distributed over a large area, it often necessitates multiple routers and switches.

The encryption units 116, 120 operate to encrypt data multiple times. Red data, plain text, is received at the encryption unit 120, which encrypts the red data resulting in gray data. The gray data is then encrypted again by the encryption unit 116 resulting in black data. The NFVO 118 can operate based on gray data.

The SDN controllers 112 manage traffic flows from the devices 102, 104, 106 and other devices on the network 108 dynamically. To achieve this end, a gradient-based routing algorithm can be deployed as an application that provides the SDN controller 112 with an optimal routing path (optimal in terms of one or more constraints).

The SDN controllers 112 are architected such that they are deployed on every device 102, 104, 106 and can run standalone. Examples of standalone SDN controllers 112 are available using OpenFlow native or Netconf (open industry standards) commands, or as part of SDN controller of controllers (e.g., SDA's NDSA where a master government NOC controller on the ground will oversee all the other vendor-provided controllers on-orbit).

The NFVO 118 is deployed to provide VNF lifecycle management as well as network management of the operations performed by the VNFs 122, 124, 126. The NFVO 118 coordinates resources and networks needed for cloud-based services and applications.

The network 108 is a collection of switches, routers, firewalls, gateways, and other devices, the allow the devices 102, 104, 106 to communicate with one another. The communication can be wired, wireless, or a combination thereof.

Figure 2:
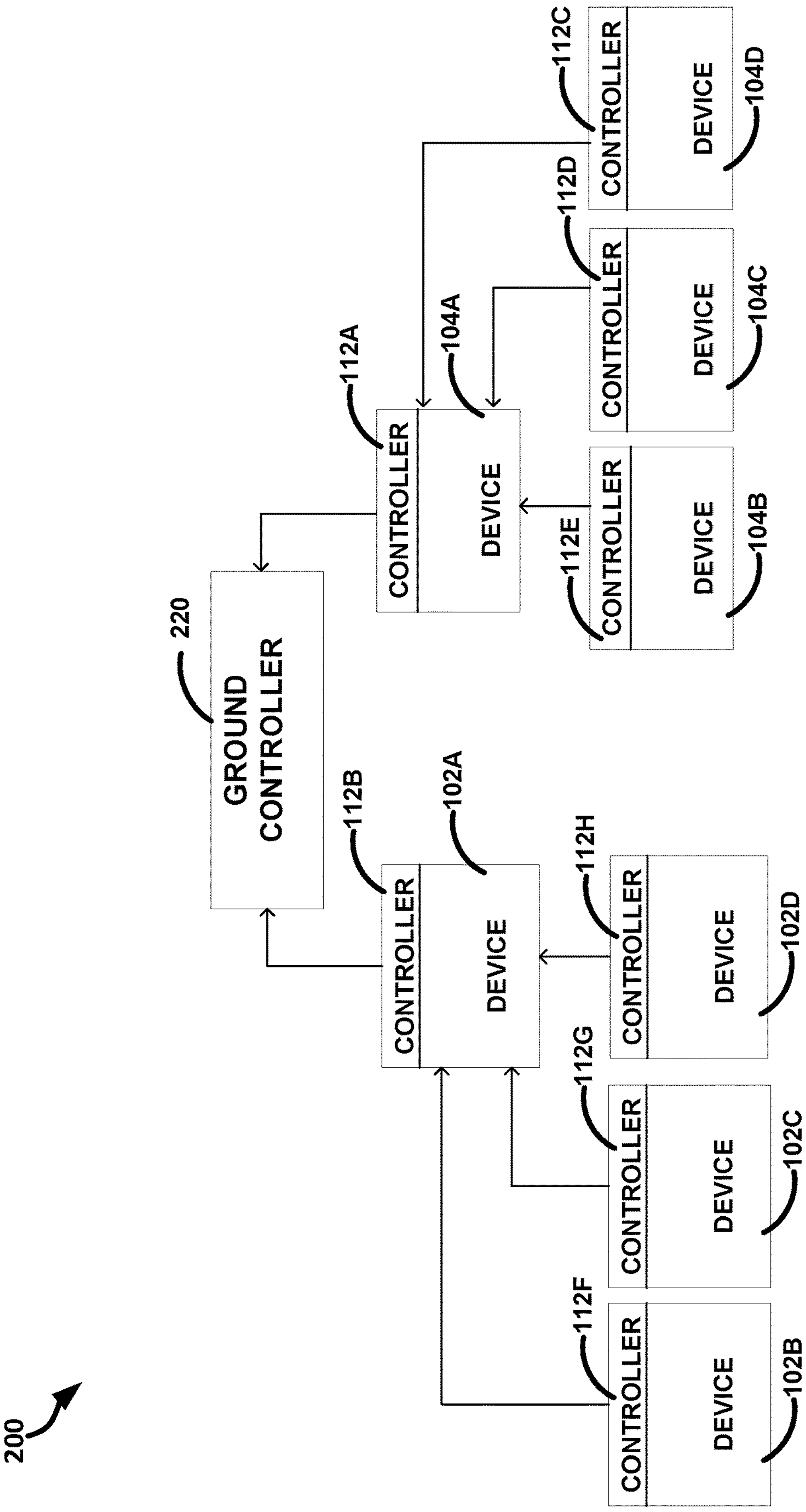
FIG. 2 illustrates, by way of example, a diagram of an embodiment of a hierarchical SDN controller model deployment.

FIG. 2 illustrates, by way of example, a diagram of an embodiment of a hierarchical SDN controller model 200 deployment. The hierarchical controller model 200 can scale to run on all or just a subset of the devices 102, 104, 106. The SDN controller model 200 includes a root controller 220, such as at one or more ground stations. A ground station is a device that is situated on the ground (surface of the Earth). The SDN controller model 200 further includes devices 102A, 102B, 102C, 102D, 104A, 104B, 104C, 104D. The devices 102A and 104A aggregate data from devices 102B, 102C, 102D and 104B, 104C, 104D, respectively. The devices 102A and 104A act as parent devices to the devices 102B, 102C, 102D, 104B, 104C, and 104D, sometimes called child controllers. Each child controller can operate on its own, or be controlled by its parent controller. The model 200 uses one SDN controller per device.

Figure 3:
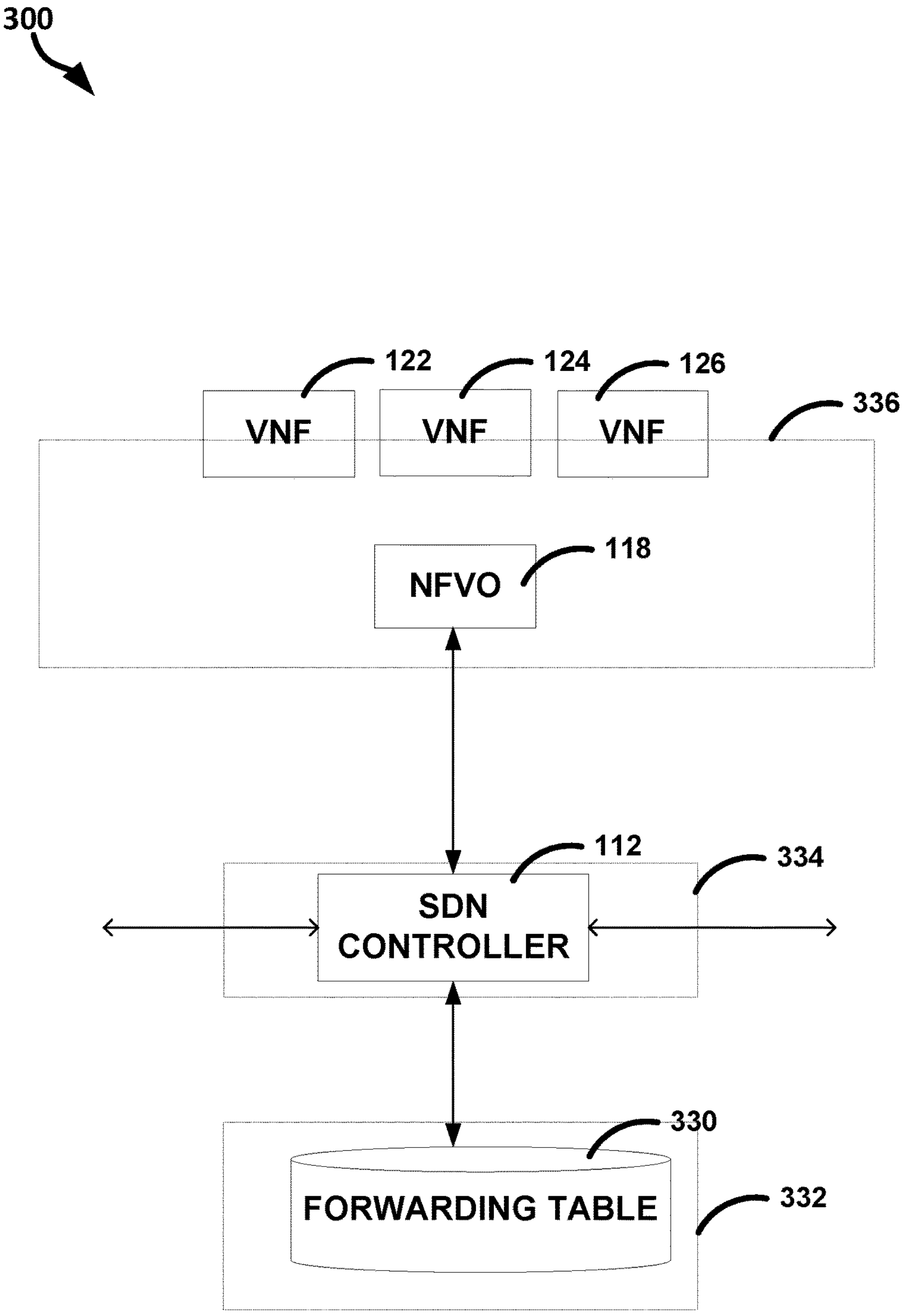
FIG. 3 illustrates, by way of example, an exploded-view diagram of an embodiment of an SDN/NFV architecture.

FIG. 3 illustrates, by way of example, an exploded-view diagram of an embodiment of an SDN/NFV architecture 300. The architecture 300 can be part of the system 100. In the architecture 300, northbound interfaces can connect to external SDN controllers 112, such as to exchange network topology information and route management applications. East/West interfaces between SDN controllers 112 can be used for routing and Common Relevant Network Operating Picture (CRNOP) dissemination. Southbound interfaces are used for injecting routes either via OpenFlow or direct Linux kernel routes. East and west interfaces manage within network 108 server to server traffic. Northbound traffic flows out of the network towards the device 102, 104, 106. Southbound traffic flows deeper into the network 108. An external SDN controller can send messages (e.g., OpenFlow message) to SDN controllers 112A, 112B, 112C, 112D, 112E, 112F, 112G, 112H as if the external SDN controller were a switch and the SDN controllers 112A, 112B, 112C, 112D, 112E, 112F, 112G, 112H then deploy the rules to the local switch under its purview.

The SDN controllers 112A, 112B, 112C, 112D, 112E, 112F, 112G, 112H capture intent from communications therebetween. The communications between the SDN controllers 112A, 112B, 112C, 112D, 112E, 112F, 112G, 112H allow the SDN controllers 112A, 112B, 112C, 112D, 112E, 112F, 112G, 112H to seamlessly extend the functionality of the SDN controllers 112A, 112B, 112C, 112D, 112E, 112F, 112G, 112H and ensure that traffic delivery continues via dynamic routing and local path recovery when pre-planned routes are not feasible for use anymore. In addition to Open-Flow, the SDN controllers 112A, 112B, 112C, 112D, 112E, 112F, 112G, 112H provide a standard interface for direct access and manipulation of the SDN controller rules and deployed services.

Regarding services, such as those provided by the VNFs 122, 124, 126, the system 100 provides an interface for integrating services. Services are composed of network function virtualizations (NFV), route management, common relevant network operating picture (CRNOP) dissemination, and specialized (e.g., autonomy) on-orbit services like space-based sensing. Service requests flow directly through the SDN controllers 112A, 112B, 112C, 112D, 112E, 112F, 112G, 112H, while service control traffic is managed through direct communication to the containing VNFs. Inter-service traffic is delivered to applications, VNFs 122, 124, 126, via a publish-subscribe interface to ensure services remain decoupled and are not dependent on a particular implementation.

For example, a service requiring global positioning service (GPS) data can retrieve it from a GPS source or an alternative position, time, and navigation (A-PNT) source. However, when services require explicit interactions, such requirements can be specified during configuration, ensuring validation and verification prior to deployment. Finally, CRNOP-based capabilities within the internal services provided by the VNFs 122, 124, 126, such as routing of appropriate information to relevant users within a tactically relevant timeline, use the east/west plane to share only the required information rather than the whole network picture (i.e. the common network operating picture or CNOP). CRNOP dissemination reduces network overhead by sharing only data relevant to each satellite, allowing the network to quickly react to network disruptions.

The forwarding table 330 includes data that governs event-based routing across the SDN-based system 100. The forwarding table 330 indicates which SDN controller 112 is to receive a given communication next.

The forwarding table 330 operates in a doubly encrypted domain 332 (black), while the SDN controller 112 operates in an encrypted domain 334 (gray) and the NFVO 118 and VNFs 122, 124, 126 operate in an unencrypted domain 336 (red).

Routes between SDN controllers 112 can be established using cost gradients and quality of service (QOS) metric sets and communicated through gradient establishment messages (GEMs). QoS metric sets operate to reduce packet loss, latency, jitter, or a combination thereof on a network. QoS metric sets can further operate to improve bandwidth, security, or a combination thereof.

GEMs can help attain scalability through a multi-hop architecture: nodes that are not within range of one another can communicate by relaying messages through intermediate neighbors. Routing information is established on-demand and is updated opportunistically as messages are passed among nodes. A node coupled to the network 108 does not single out a particular neighboring node to relay its message. Instead, it advertises its "cost" for delivering a message to a destination, and only those neighboring nodes that can deliver the message at a lower cost will participate in relaying the message. In this way, a message descends a loop-free "gradient" from originator to destination. Since multiple neighbors can participate in the relaying of messages, the system 100 maintains good connectivity in the face of frequently changing network topologies. A node does not need to know the identities of its neighbors and establishes routes on demand.

The overhead of the routing algorithm scales to $O(N \times D)$ rather than $O(N^2)$ like traditional routers, where N is the number of nodes in the network and D is the number of destinations. These routes are established on demand based on the traffic profile and the network overhead, and thus are a function of traffic flow and not the number of nodes in the network. Within the SDN system 100, when a new packet reaches a switch where there is no active flow rule established yet in the forwarding table for the type of packet, the switch will ask the controller 112 what it should do. This will trigger establishing a flow between the required source and destination for the traffic type with unique QoS desires or requirements. After the QoS aware route is established, the initial packet is released at the switch and forwarded onto the destination following the configured rule from here on out until the flow expires. Preconfigured QoS rules map traffic to a set of QOS values and therefore determine how routes are established across the network for that particular flow. The end result is (a) scalable network architecture, due to routes only existing between endpoints that are using them; (b) resilient in the face of disruptions as routes are updated based on link conditions; and (c) QoS aware, utilizing only appropriate links based on the type of traffic (e.g. video traffic only traverses high capacity links).

The system 100 can use the Classified Solutions for Commercial (CSIC) framework developed by the National Security Agency (NSA) to secure its SDN-based network management system. The system 100 supports a traditional high assurance internet protocol encryptor (HAIPE) red/black separation using Type 1 solution. The HAIPE is a device that looks up a destination IP address of a packet in an internal security associated databased (SAD) and picks an encrypted channel for communication based on an appropriate entry.

CSfC is designed to allow validation of a system within months rather than years, and is therefore a good model to follow when deploying commercial solutions in building LEO constellation. However, being adaptable to different red/black separation deployment types also allows for backwards compatibility with legacy systems or when the CSfC architecture is too restrictive and direct certification or a realistic path to certification (certifiable) with the NSA is required.

CSfC uses a dual layer encryption mechanism, with a gray layer between the red and black layers. The dual layer encryption mechanism provides redundant encryption in case one of the encryption methods is compromised by either human error or malicious attack. Each layer of encryption at the data layer and the network layer utilizes different underlying methodologies to reduce the risk of such errors. Embodiments help ensure that mission-critical space applications get the QoS they require, even with the red-black separation, and is consistent with assumptions made within Space Development Agency (SDA)'s Tranche 1 Transport Layer (TITL) NEBULA standard.

For communication between SDN controllers 112, a discovery process can be followed by an election process. The discovery process determines which controllers 112 are nearby and functional. The election process determines a leader for a group of SDN controllers 112. SDN controllers 112 can be referred to as a parent or a child. These terms are relative to SDN controllers 112. A parent controller is elected or selected as a leader relative to a child controller. The child then communicates to the parent that manages further dissemination of the communication. A parent controller can also be a child controller relative to another controller.

A discovery process can help identify which may be inaccessible due to a variety of factors, such as link disruption or link mobility. The discovery process can be a peer-to-peer (P2P) communication process that includes a gossip protocol. The gossip protocol is a decentralized P2P communication technique that includes message transmission in a distributed manner. In the gossip protocol, each device 102, 104, 106 can send a message to a subset of other devices 102, 104, 106. The subset can be random, based on a heuristic, or formed with another selection process. P2P communication allows for use of compression technology on serialized messages, which reduces message overhead. The controller 112 can employ Lempel-Ziv deflation for automatic message size reduction, for example.

Pseudocode for a P2P discovery technique is provided:

```
T_local ← { }, T_seed ← {...}
C_lapsed ← { }, C_active ← T_seed
P ← UNSET
while running do
    for all C ∈ (T_local ∪ T_seed)do
        if C ∈ C_lapsed do
          Broadcast (T_local, P, Children)to C on speculative interval
        else if C ∈ C_active do
          Broadcast (T_local, P, Children)to C on maint. interval
        else
          Broadcast (T_local, P, Children)to C on establish interval
        end if
    end for
    U ← receive (any inbound network east - west messages)
    C_lapsed ← {C: C ∈ C_active ∧ C ∉ U ∧
    C has not sent status beyond timeout}
    C_active ← {C: C ∈ T_local ∪ T_seed ∧ C ∈ U}
end while
```

The discovery technique can include recording established and currently-reachable children $C_{active}$, previously established but currently unresponsive children $C_{lapsed}$, seed peers $T_{seed}$ for P2P discovery, all known reachable controllers $T_{local}$, and a single parent P. On startup, each controller is given a set of seed peers to contact. During operation, the controller advertises itself to the combined set of known active controllers and the seed controllers. Depending on how these controllers are categorized, the controller can advertise itself to the seed peers and active controllers on different intervals. After advertising, the controller listens for controllers to advertise themselves. The list of active and lapsed peers is updated based on the advertisements that are received at the controller.

Distributed operation can be aided by controller 112 leader election, where groups of controllers 112 delegate knowledge to controllers 112 above them (elected leaders), such as to optimize a network load resulting from topology synchronization. These leaders, locally considered parents in the controller 112, are responsible for coordinating and making decisions for controllers 112 that are its direct or indirect children. These parents can either be statically configured to act as leaders for a fixed group of nodes, or they can be elected on a best-effort basis using a continuous election procedure. Elections with the controller 112 can implement a leader election heuristic with the intention of good recovery from arbitrary levels of disruption. Elections can continuously follow a described heuristic, opportunistically performing re-elections after a controller 112 gains knowledge it might be eligible to become a parent of another controller 112. This process is described in pseudocode below.

Controllers 112 assess their peers and opportunistically send requests to parent-less local controllers, requesting to become their parent. After a potential child controller receives parentage offers from its peers in a configurable window of time, it ranks its peers based on their advertised attributes and position in the topology to determine who would make the best parent controller.

Controllers are un-parented if, in this distributed best-effort election, some configuration or logical principle is violated. Possible conditions could include cases like the introduction of a cycle in the hierarchy, tree imbalance beyond a configurable bound, or a tree height beyond an allowable limit. Controllers are also un-parented if they are inaccessible beyond some configurable window of time. Since all controllers are opportunistic in providing parentage offers, this election is continually ongoing on a local basis as connections are established, degrade, and then become inoperable due to the evolving nature of the topology.

Every SDN controller looks at their reachable peers (as determined by the discovery pseudocode presented previously) periodically and determines if any of those peers have advertised having a parent. If they have not and the current controller would be an eligible parent (a controller might be ineligible to be a parent if they were already the grandparent of the potential child controller, for instance), the current controller can ask to become the parent of the potential child controller. A controller without a parent may receive many of these parenting offers. The controller that receives the parenting offers will make a decision according to the offer selection process, such as after a configurable window of time.

In the offer selection process, the controller collects and inspects all the offers received from prospective parents. After discarding any invalid parenting offers, the controller ranks the remaining offers according to a metric and picks the top-ranked choice. This becomes the temporary/prospective parent. After a parent is picked the selected prospective parent is advertised to the controllers. If the prospective parent does anything in the meantime to make it an invalid parent, the parent is unparented the offer selection process is repeated.

The parent election pseudocode (offer selection process) is provided:

```
Given T_local, T_seed, C_lapsed, C_active
Children ← { }
while running do
        P_candidates ← {C ∈ C_active ∧ C ∉ Children}
        while P = UNSET do
                P_tmp ← top(rank(P_candidates))
                Broadcast (T_local ∪ T_seed P, Children)to P_tmp
                if receive (T_{P_tmp}, P_{P_tmp}, C_{P_tmp}) and (self ∈ T_{P_tmp} ∧
self ≠ P_{P_tmp} ∧ self ∈ C_{P_tmp}) do
                        P ← P_tmp
                else
                        P_candidates ← P_candidates/P_tmp
                end if
        end while
        if P ∈ C_lapsed ∨ Forms Hierarchy Cycle (P) ∨ P ∈ Children do
                Broadcast (unparent(P))
                P ← UNSET
        end if
end while
```

Because the formed leader relationship forces each controller 112 to obtain a parent if it is possible to do so, and as every parent-child bond cannot form a cycle in the command hierarchy, the command structure formed is tree-like in nature. Metrics for rank can encourage or discourage this tendency. An example family of metrics is to rank each candidate parent by number of children. To make the control structure more tree-like while obtaining a parent, one can rank candidate parents by number of existing children ("degree") from least to most, then ask to be children of the lowest-degree controllers. Conversely, one can prevent the control structure from being a tree by stipulating that candidate parents will only be accepted if they have zero current children, which will create a chain-like structure.

Figure 4:
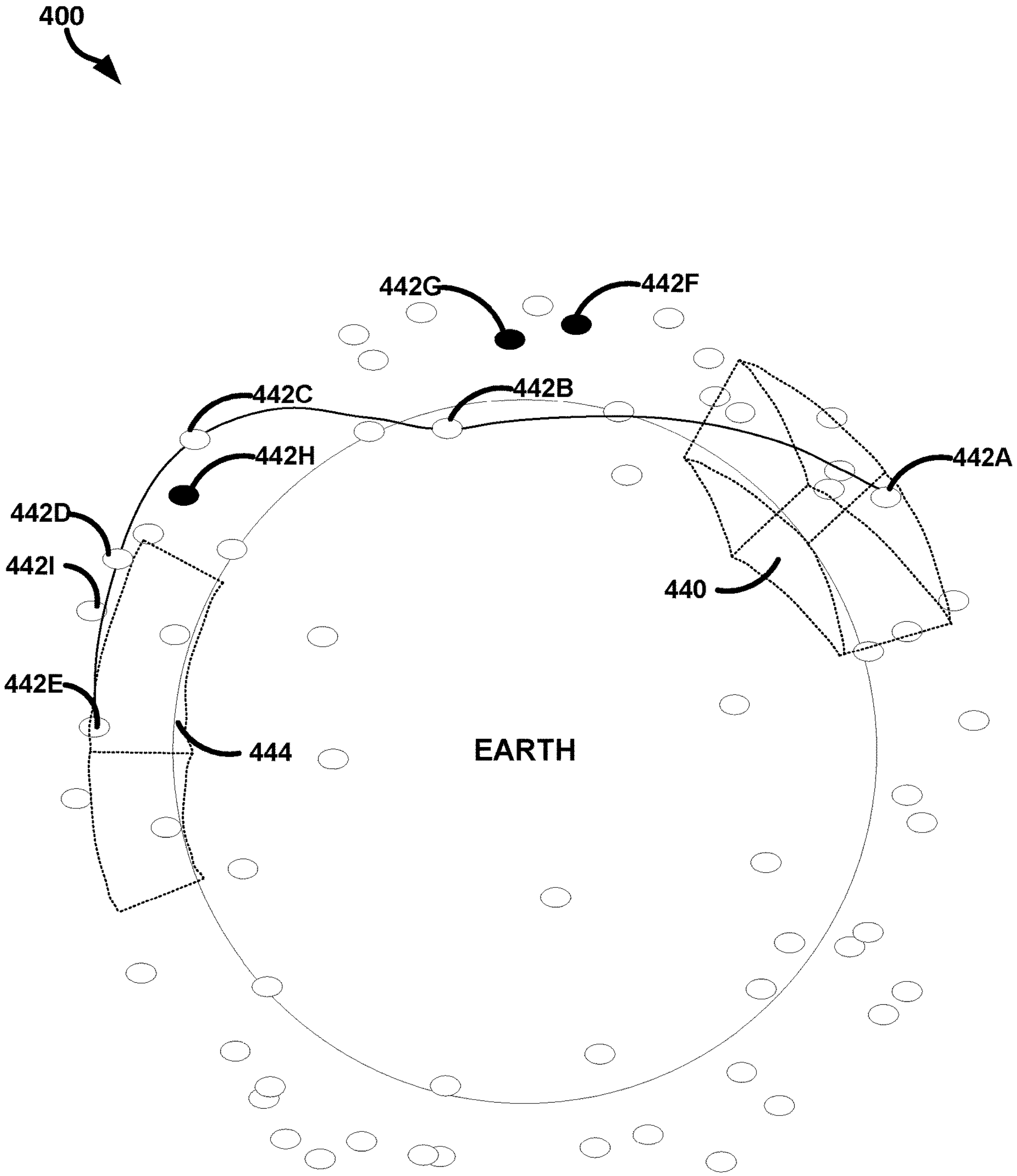
FIG. 4 illustrates, by way of example, a diagram of a hypothetical scenario where a ground-based terminal in first geolocation observes an event that is reportable to remote listeners in a second geolocation.

FIG. 4 illustrates, by way of example, a diagram of a hypothetical scenario where a ground-based terminal in first geolocation 440 observes an event that is reportable to remote listeners in a second geolocation 444. A D4-enabled LEO constellation of satellites 442 has been tasked with watching for a type-A formatted tactical message announcements in the first geo-location 440. The constellation of satellites 442 will then:

1) Perform any local calculations needed to transform the observation into IP encapsulation of type-A formatted data it receives from the ground.
2) Pass the message to the queues in the satellites 442 entering the first geo-location 440. At this point, the ground emitter may very well be disconnected from the space mesh network as content publishers are decoupled from the content subscribers within the satellite constellation. The encapsulated type-A IP messages get passed to VNFs 122, 124, 126 in satellites 442 at another geo-location using network caches and store-and-forward technique discussed previously. Then they get converted into Type-B tactical messages after decryption with the geolocation based keys that each satellites in the right area of regard (AOR) receive from the key repository at a specified time. The key repository can be implemented by a VNF 122, 124, 126. The VNF 122, 124, 126 can exist in-orbit or on the ground. When the NFVO decides what asset(s) should host a service inside an AOR, it can retrieve a key from the key repository VNF and provide it to the relevant assets that need to run the desired service.

Without loss of generality, some examples of packets and corresponding encryption include, for example, Type A packets that can be encrypted using Quick User Datagram Protocol (UDP) Internet Connections (QUIC) (Request for Comments (RFC) 9000) traffic from an application that can only talk QUIC, and Type B packets might be Datagram Congestion Control Protocol (DCCP) (RFC 4340) traffic from a DCC-only application. Type A packets are sequence controlled and Type B packets are expedited.

3) Formatted tactical messages are broadcast to users using different tactical links to users in a relevant geo-location on the ground. These relays can be bidirectional or unidirectional based on the operating environment and mission security controls.

Simulation/Emulation

All evaluated orbital topologies were created in Ansys Systems Tool Kit (STK), an industry-standard physics-based mission modeler. STK simulations for 24-hour orbital dynamics and line-of-sight data using 1-second intervals were performed, then recorded positions and access for each satellite at every discrete time interval. Simulated orbital positions for each satellite in every orbital topology were then converted into contact graphs, where contact is determined by a satellite pair having line of site (LOS) to each other or to the ground. In this model, while LOS is maintained, contact is maintained. No limit to the potential number of simultaneous LOS contacts are put in place. For LEO topology construction, a Walker-Delta topology was used by current-generation large constellations like Starlink Phase 1 Version 3 and Kuiper Shell 2. Simulations were performed with 6 rings, each composed of 15 near-polar satellites in counter-rotating pairs.

As the underlying constellation topologies greatly affect distribution of contact times. Using this simulation, almost all satellites come into transient contact with a peer on a different ring for more than 5 minutes in every 24 hour cycle, and over half of the periods of contact are over 18 minutes in duration. This allows more than sufficient time to propagate topology state information across the full constellation.

Neighboring satellites on a ring have constant contact with their one-hop neighbors barring an operational disruption. Each satellite vehicle (SV) hosts one OpenFlow switch, one SDN controller, and one router instance as shown in FIG. 1.

To model the scenario, a Docker and Linux Traffic Control (TC) system was employed, where one container represented a single satellite, and Linux TC enabled or disabled container-to-container links following the generated contact graph. This network behavior was replayed in real time.

Scalability Experimentation Results

A computational load of the controller, which is dominated by its connection model was surveyed. The overhead is, in general, extremely small. The connection design is more reliant on waiting for events than actively needing to distribute large amounts of information. Because the number of connection events is minimal due to the physical characteristics of orbit, only process one or two topology change events are processed at any given time, which has low computational impact.

Because of the sparsity of connection events, the controller can be implemented to run at large scale or on small CPUs with minimal load. During scalability experiment, devices were emulated inside Docker containers in the EC2 instance, with each device (e.g., SDN controller, router, NFVO) container pinned to one CPU thread. The results from the 90 node experiment are shown in table I.

TABLE I

Scalability Results in Terms of CPU Load, Message Processing Performance, Routing Overhead, and VNF Availability When Running Device Instances on Either 16 or 90 Different Containers Within a Simulation Instance

| Metric | 16 Node Network | 90 Node Network |
|---|---|---|
| Individual Node Metrics | | |
| CPU LOAD (%) | 0 | 0 |
| VNF COVERAGE (%) | 99 | 99 |
| NFVO-To-NFVO Communication Metrics | | |
| MESSAGE LOSS | 0 | 0 |
| MIN MESSAGE LATENCY | 1 ms | 1 ms |
| MAX MESSAGE LATENCY | 6.7 s | 6.7 s |
| AVG MESSAGE LATENCY | 44 ms | 85 ms |

Disruption Tolerance Results

Consider cases in which operational disruption is experienced either due to satellites failure or link jamming at the satellite receiver. This is emulated by disabling the satellite or its radio receiver momentarily or permanently based on the experimental scenario.

The reliability of the system 100 in the face of disruption depends heavily on constellation topology. Geometrically, a single ring can withstand at least one loss with fast re-route within seconds; but two losses of nonadjacent satellites in the same ring causes a network partition, which then requires replanning of the routes that can take up to 15 seconds for a 90-node constellation based on the topology and resource availability. In the example shown in FIG. 4, three satellites 442F, 442G, 442H are not able to communicate. Each of the satellites 442F, 442G, 442H are from a different ring of the constellation. The objective is still to deliver Type A tactical data via Type B tactical link. The D4 router detects the loss of the nodes quickly, by the discovery technique discussed previously, and re-routes around the disabled satellite vehicles. The route in FIG. 4 goes from satellite 442A, to satellite 442B, to satellite 442C, to satellite 442D, to satellite 442E and to the users or ground station in the second geographic region 444.

TABLE II

Disruption Tolerance Results for 90 Node Network

| Metric | Baseline | Disrupted |
|---|---|---|
| Network Wide Statistics | | |
| VNF COVERAGE (%) | 99.69 | 99.63 |
| SUCCESSFUL IN-BAND SIGNALING (IBS) TRANSMISSIONS (%) | 99.5 | 99.23 |
| NFVO-To-NFVO Communication Metrics | | |
| MESSAGE LOSS | 0 | 0 |
| MIN MESSAGE LATENCY | 1 ms | 1 ms |
| MAX MESSAGE LATENCY | 13.87 s | 15.25 s |
| AVG MESSAGE LATENCY | 204 ms | 205 ms |

As shown in Table II, the system 100 maintains high coverage and high percentage of successful Type B tactical link sends (≈99.23%) when the network is disrupted. The maximum latency slightly increases from 13 seconds to 15 seconds and the average latency increases from 204 ms to 205 ms in the face of network partition. The minimal increase in latency is just as likely to be due to non-determinism in the routing algorithm as loss of the vehicles. Nevertheless, the results successfully demonstrates the system 100 operating through the loss of multiple (targeted in the demo by the emulated adversarial user) satellite vehicles.

East-West Interface Optimization

In this section, the SDN control plane messaging overhead between adjacent controllers over the East-West interface is explored. Specifically, consider the message optimization effect of LZ77 deflation on message size, and the role of SDN controller(s) synchronization interval tuning for a given constellation topology has on minimizing packets sent between different-domain (e.g., different constellation provider rings) SDN controllers without any degradation on the routing performance. The results are shown in Table III.

TABLE III

East-West Optimization Results

| Measurement | Before Optimization | After Optimization |
|---|---|---|
| Packets | 1456 | 1275 |
| Time Span (seconds) | 485044 | 485043 |
| Avg. Packets per Second | 3 | 2.6 |
| Avg. Packet Size (bytes) | 183 | 111 |
| Avg. Kilobytes per Second | 4.4 | 2.34 |

All considered metrics for east-west controller interface synchronization are improved when the east-west optimization approach is adopted. In particular, the average sync rate decreases by 47% compared to the case when no east-west optimization is adopted, mostly resulting from increased efficiency due to LZ77 deflation. Other deflating compression techniques are expected to provide similar results.

Hierarchical SDN Results

In practice, election of SDN controllers for managing different domains within a space network of (different vendor) constellation networks tends to converge quickly, even at 90-node topologies or larger. Simulations for up to 144 SDN controllers were performed. Because of the evolving nature of the constellation's connections and the continual need to perform local re-elections to reflect the links dynamics and topology change as a function of different disruption model, it is difficult to provide a meaningful formulation of the worst-case election time. However, for the best case scenario of no unintentional disruption other than the predictive orbital dynamics, it was shown that the election time is linearly proportional to the number of controllers.

The system 100 instantiates a secure mesh networking among multivendor constellation satellites in LEO. The system 100 can operate by adhering to the SDA's T1TL NEBULA standard and using commercial standards derived technologies. The system 100 support SDA's current vision of network and Battle Management and Command and Control (BMC2) application management from the ground operation center in predictable operating environment but also allows resilient on-orbit autonomous operation without needing constant control from the ground in the face of satellite-to-satellite and satellite-to-ground link disruptions. The system 100 is backwards compatible with SDA's NEBULA standard but is also forward looking when it comes to supporting the near-future need of having to deal with congested and/or contested LEO operating environment.

Figure 5:
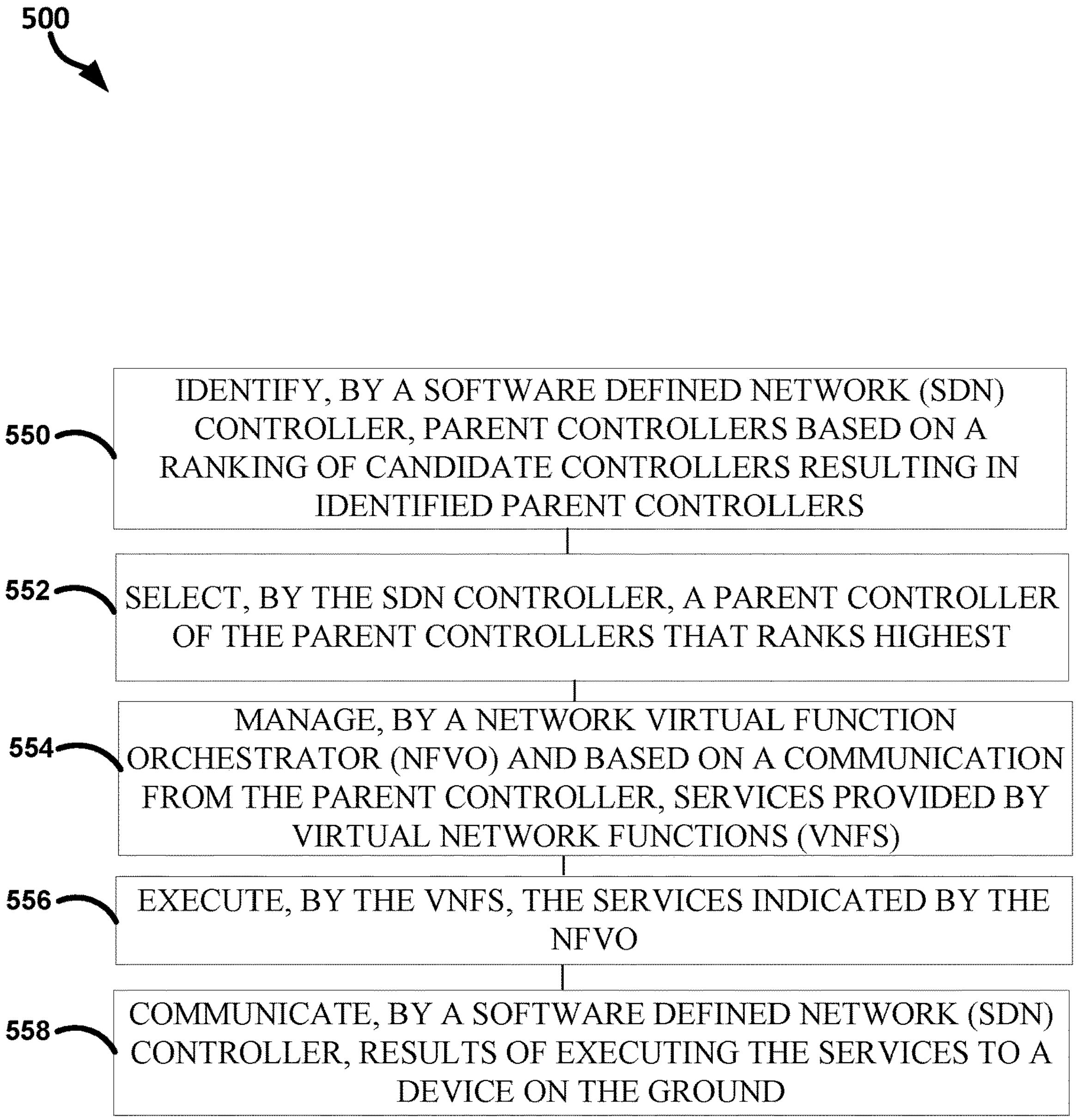
FIG. 5 illustrates, by way of example, a diagram of an embodiment of a method for device discovery.

FIG. 5 illustrates, by way of example, a diagram of an embodiment of a method 500 for D4 enabled satellite mesh network operation. The method 500 as illustrated includes identifying, by a software defined network (SDN) controller, parent controllers based on a ranking of candidate controllers resulting in identified parent controllers, at operation 550; selecting, by the SDN controller, a parent controller of the parent controllers that ranks highest, at operation 552; managing, by a network virtual function orchestrator (NFVO) and based on a communication from the parent controller, services provided by virtual network functions (VNFs), at operation 554; executing, by the VNFs, the services indicated by the NFVO, at operation 556; and communicating, by a software defined network (SDN) controller, results of executing the services to a device on the ground, at operation 558.

The method 500 can further include discovering, by the SDN controller, which controllers are potential parent satellites resulting in identified potential parent satellites. The method 500 can further include advertising, by the SDN controller, the machine to the identified potential parent satellites as a potential parent controller.

Identifying the parent controller can include the SDN controller receiving respective communications from controllers that are active controllers, known seed controllers, and are unknown to the satellite. Identifying the parent controller can include updating, by the SDN controller, a list of active peers and lapsed peers based on the received respective communications.

The ranking can include discarding any identified parent controllers that are invalid. The ranking can be based on a number of child controllers associated with the identified parent controllers. The method 500 can further include communicating a selected SDN controller of the identified potential parent controllers based on the ranking.

Figure 6:
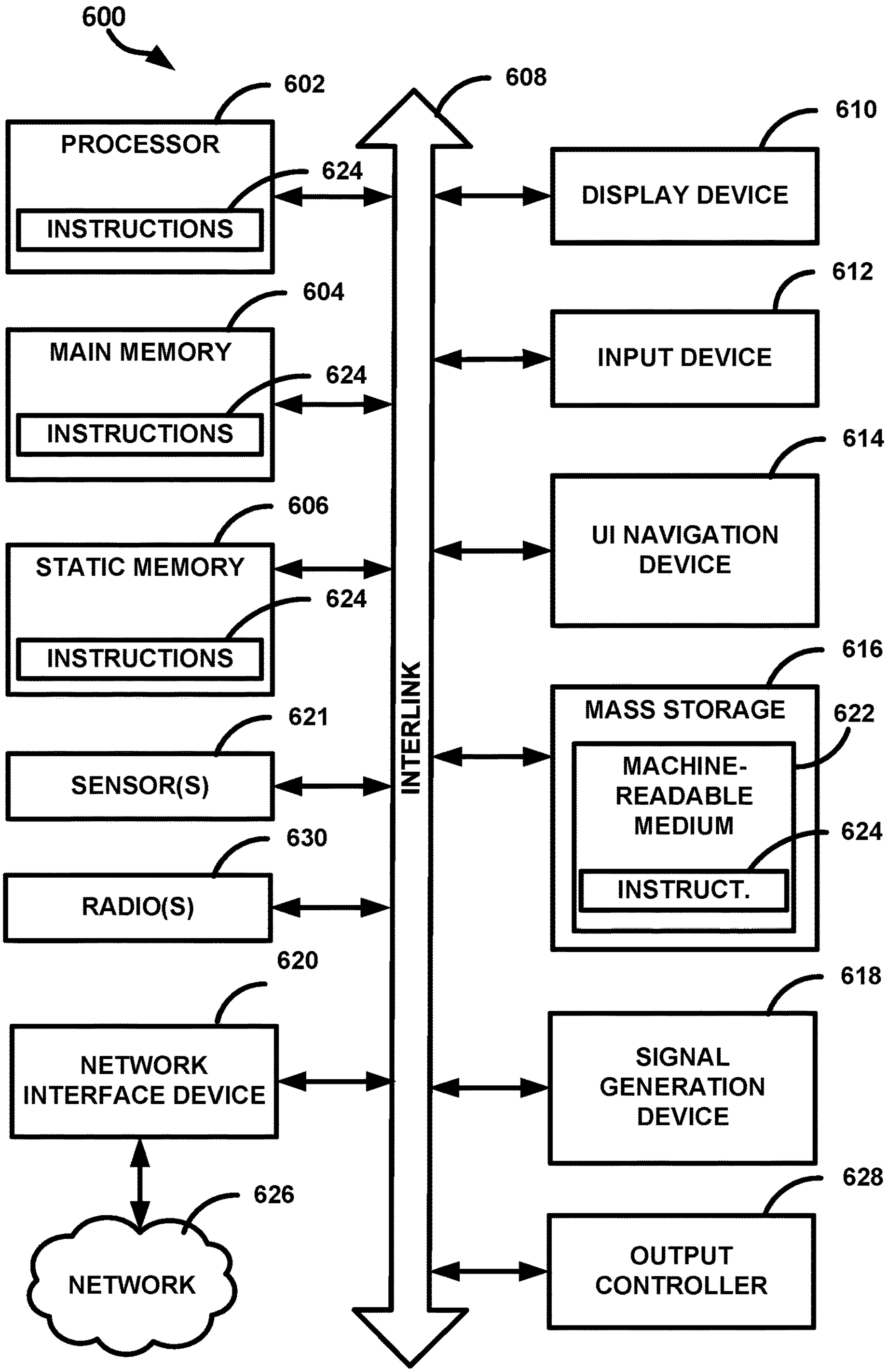
FIG. 6 illustrates, by way of example, a block diagram of an embodiment of a machine in the example form of a computer system 800 within which instructions, for causing the machine to perform any one or more of the methods or techniques discussed herein, may be executed.

FIG. 6 illustrates, by way of example, a block diagram of an embodiment of a machine in the example form of a computer system 800 within which instructions, for causing the machine to perform any one or more of the methods or techniques discussed herein, may be executed. One or more of the device 102, 104, 106, router 110, SDN controller 112, router 114, red/gray encryption 120, gray/black encryption 116, NFVO 118, VNF 122, 124, 126, network 108, ground controller 220, forwarding table 330, satellite 442, method 500, or other component, operation, or technique, can include, or be implemented or performed by one or more of the components of the computer system 600. In a networked deployment, the machine may operate in the capacity of a server or a client machine in server-client network environment, or as a peer machine in a peer-to-peer (or distributed) network environment. The machine may be a personal computer (PC), server, a tablet PC, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a mass storage unit 616, a signal generation device 618 (e.g., a speaker), a network interface device 620, and a radio 630 such as Bluetooth, WWAN, WLAN, and NFC, permitting the application of security controls on such protocols.

The mass storage unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 624 may further be transmitted or received over a communications network 626 using a transmission medium. The instructions 624 may be transmitted using the network interface device 820 and any one of a number of well-known transfer protocols (e.g., HTTPS). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of encoding, or carrying instructions for execution by the machine, and includes digital or analog communications signals or other intangible media to facilitate communication of such software.

ADDITIONAL EXAMPLES

Example 1 includes a distributed, disrupted, disconnected and denied D4 enabled satellite configured for D4 operations in a mesh network of D4 enabled satellites, the D4 enabled satellite comprising virtual network functions (VNFs), a network virtual function orchestrator (NFVO), and a software defined network (SDN) controller configured for secure VNF-VNF or VNF-ground communications.

In Example 2, Example 1 further includes, wherein the SDN controller is configured to identify parent controllers based on a ranking of candidate controllers resulting in identified parent controllers.

In Example 3, Example 2 further includes, wherein identifying the parent controller includes discovering which controllers are potential parent satellites resulting in identified potential parent satellites.

In Example 4, Example 3 further includes, wherein the SDN controller is further configured to advertise itself to the identified potential parent satellites.

In Example 5, at least one of Examples 3-4 further includes, wherein identifying the parent controller includes the SDN controller receiving respective communications from controllers that are active controllers, known seed controllers, and are unknown to the satellite.

In Example 6, Example 5 further includes, wherein identifying the parent controller includes updating a list of active peers and lapsed peers based on the received respective communications.

In Example 7, at least one of Examples 3-6 further includes, wherein the ranking includes discarding any identified parent controllers that are invalid.

In Example 8, Example 7 further includes, wherein the ranking is based on a number of child controllers associated with the identified parent controllers.

In Example 9, Example 8 further includes, wherein the SDN controller is configured to communicate a selected SDN controller of the identified potential parent controllers based on the ranking.

Example 10 includes a system comprising a mesh network of distributed, disrupted, disconnected and denied (D4) enabled satellites configured for D4 operations, each of the D4 enabled satellites comprising virtual network functions (VNFs), a network virtual function orchestrator (NFVO), and a software defined network (SDN) controller configured for secure VNF-VNF or VNF-ground communications, the SDN controller is configured to identify parent controllers based on a ranking of candidate controllers resulting in identified parent controllers and select a parent controller of the parent controllers that ranks highest.

In Example 11, Example 10 further includes, wherein identifying the parent controller includes discovering which controllers are potential parent satellites resulting in identified potential parent satellites.

In Example 12, Example 11 further includes, wherein the SDN controller is further configured to advertise itself to the identified potential parent satellites.

In Example 13, at least one of Examples 11-12 further includes, wherein identifying the parent controller includes the controller receiving respective communications from controllers that are active controllers, known seed controllers, and are unknown to the satellite.

In Example 14, Example 13 further includes, wherein identifying the parent controller includes updating a list of active peers and lapsed peers based on the received respective communications.

In Example 15, at least one of Examples 11-14 further includes, wherein the ranking includes discarding any identified parent controllers that are invalid.

In Example 16, Example 15 further includes, wherein the ranking is based on a number of child controllers associated with the identified parent controllers.

In Example 17, Example 16 further includes, wherein the SDN controller is configured to communicate a selected SDN controller of the identified potential parent controllers based on the ranking.

Example 18 includes a non-transitory machine-readable medium including instructions that, when executed by a machine, cause the machine to perform operations for distributed, disrupted, disconnected and denied (D4) enabled satellite operations in a mesh network of D4 enabled satellites, the operations comprising identifying, by a software defined network (SDN) controller, parent controllers based on a ranking of candidate controllers resulting in identified parent controllers, selecting, by the SDN controller, a parent controller of the parent controllers that ranks highest, managing, by a network virtual function orchestrator (NFVO) and based on a communication from the parent controller, services provided by virtual network functions (VNFs), executing, by the VNFs, the services indicated by the NFVO, and communicating, by a software defined network (SDN) controller, results of executing the services to a device on the ground.

In Example 19, Example 18 further includes, wherein the operations further comprise discovering, by the SDN controller, which controllers are potential parent satellites resulting in identified potential parent satellites.

In Example 20, Example 19 further includes, wherein the operations further comprise, advertising, by the SDN controller, the machine to the identified potential parent satellites as a potential parent controller.

Although teachings have been described with reference to specific example teachings, it will be evident that various modifications and changes may be made to these teachings without departing from the broader spirit and scope of the teachings. Accordingly, the specification and drawings are to be regarded in an illustrative rather than a restrictive sense. The accompanying drawings that form a part hereof, show by way of illustration, and not of limitation, specific teachings in which the subject matter may be practiced. The teachings illustrated are described in sufficient detail to enable those skilled in the art to practice the teachings disclosed herein. Other teachings may be utilized and derived therefrom, such that structural and logical substitutions and changes may be made without departing from the scope of this disclosure. This Detailed Description, therefore, is not to be taken in a limiting sense, and the scope of various teachings is defined only by the appended claims, along with the full range of equivalents to which such claims are entitled.

What is claimed is:

1. A distributed, disrupted, disconnected and denied (D4) enabled satellite configured for D4 operations in a mesh network of D4 enabled satellites, the D4 enabled satellite comprising:

virtual network functions (VNFs);

a network virtual function orchestrator (NFVO); and a software defined network (SDN) controller configured for secure VNF-VNF or VNF-ground communications;

wherein the SDN controller is configured to identify parent controllers based on a ranking of candidate controllers resulting in identified parent controllers.

2. The D4 enabled satellite of claim 1, wherein identifying the parent controller includes discovering which controllers are potential parent satellites resulting in identified potential parent satellites.

3. The D4 satellite of claim 2, wherein the SDN controller is further configured to advertise itself to the identified potential parent satellites.

4. The D4 enabled satellite of claim 2, wherein identifying the parent controller includes the SDN controller receiving respective communications from controllers that are active controllers, known seed controllers, and are unknown to the satellite.

5. The D4 enabled satellite of claim 4, wherein identifying the parent controller includes updating a list of active peers and lapsed peers based on the received respective communications.

6. The D4 enabled satellite of claim 2, wherein the ranking includes discarding any identified parent controllers that are invalid.

7. The D4 enabled satellite of claim 6, wherein the ranking is based on a number of child controllers associated with the identified parent controllers.

8. The D4 enabled satellite of claim 7, wherein the SDN controller is configured to communicate a selected SDN controller of the identified potential parent controllers based on the ranking.

9. A system comprising a mesh network of distributed, disrupted, disconnected and denied (D4) enabled satellites configured for D4 operations, each of the D4 enabled satellites comprising:

virtual network functions (VNFs);

a network virtual function orchestrator (NFVO); and a software defined network (SDN) controller configured for secure VNF-VNF or VNF-ground communications, the SDN controller is configured to identify parent controllers based on a ranking of candidate controllers resulting in identified parent controllers and select a parent controller of the parent controllers that ranks highest.

10. The system of claim 9, wherein identifying the parent controller includes discovering which controllers are potential parent satellites resulting in identified potential parent satellites.

11. The system of claim 10, wherein the SDN controller is further configured to advertise itself to the identified potential parent satellites.

12. The system of claim 10, wherein identifying the parent controller includes the controller receiving respective communications from controllers that are active controllers, known seed controllers, and are unknown to the satellite.

13. The system of claim 12, wherein identifying the parent controller includes updating a list of active peers and lapsed peers based on the received respective communications.

14. The system of claim 10, wherein the ranking includes discarding any identified parent controllers that are invalid.

15. The system of claim 14, wherein the ranking is based on a number of child controllers associated with the identified parent controllers.

16. The system of claim 15, wherein the SDN controller is configured to communicate a selected SDN controller of the identified potential parent controllers based on the ranking.

17. A non-transitory machine-readable medium including instructions that, when executed by a machine, cause the machine to perform operations for distributed, disrupted, disconnected and denied (D4) enabled satellite operations in a mesh network of D4 enabled satellites, the operations comprising:

identifying, by a software defined network (SDN) controller, parent controllers based on a ranking of candidate controllers resulting in identified parent controllers;

selecting, by the SDN controller, a parent controller of the parent controllers that ranks highest;

managing, by a network virtual function orchestrator (NFVO) and based on a communication from the parent controller, services provided by virtual network functions (VNFs);

executing, by the VNFs, the services indicated by the NFVO; and communicating, by a software defined network (SDN) controller, results of executing the services to a device on the ground.

18. The non-transitory machine-readable medium of claim 17, wherein the operations further comprise discovering, by the SDN controller, which controllers are potential parent satellites resulting in identified potential parent satellites.

19. The non-transitory machine-readable medium of claim 18, wherein the operations further comprise, advertising, by the SDN controller, the machine to the identified potential parent satellites as a potential parent controller.

* * * * *